(12) United States Patent
Netz et al.

(10) Patent No.: US 6,438,537 B1
(45) Date of Patent: Aug. 20, 2002

(54) USAGE BASED AGGREGATION OPTIMIZATION

(75) Inventors: Amir Netz; Mosha Pasumansky, both of Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/337,226

(22) Filed: Jun. 22, 1999

(51) Int. Cl.[7] .............................................. G06F 17/30
(52) U.S. Cl. ................................. 707/3; 707/4
(58) Field of Search ............................... 707/1, 2, 3, 4, 707/5, 6, 7, 100, 102, 103, 200

(56) References Cited

U.S. PATENT DOCUMENTS

| | | | | |
|---|---|---|---|---|
| 5,918,232 A | * | 6/1999 | Pouschine et al. | 707/103 |
| 5,926,820 A | * | 7/1999 | Agrawal et al. | 707/200 |
| 6,115,714 A | * | 9/2000 | Callagher et al. | 707/100 |
| 6,205,447 B1 | * | 3/2001 | Malloy | 707/102 |
| 6,282,447 B1 | * | 8/2001 | Gleichauf et al. | 707/102 |

OTHER PUBLICATIONS

Chatziantoniou et al. (IEEE publication, Apr. 2001) discloses the MD–join: An operator for complex OLAP, pp. 524–533.*

Chen et al. (IEEE publication, Mar. 2000) discloses a data–warehouse/OLAP framework for scable telecommunication tandem traffic analysis pp. 201–210.*

Flores, et al. (IEEE publication, Jul. 2000) discloses characterization of segmentation methods for multidimensional metrics, pp. 645–647.*

* cited by examiner

*Primary Examiner*—Diane D. Mizrahi
(74) *Attorney, Agent, or Firm*—Woodcock Washburn LLP

(57) ABSTRACT

Designing aggregations according to a weighted benefit/cost ratio is disclosed. Usage statistics including frequency counts are maintained for queries issued to the system. The usage statistics determine the domain of potentially useful aggregations. The system maintains benefit and cost data for aggregations in terms of row scans saved and number of rows required to store an aggregation. In addition, query frequency counts are used to scale the aggregation benefit/cost for a set of aggregations. The weighted benefit/cost ration determines the aggregations to instantiate, thereby providing an optimal combination of performance and cost.

37 Claims, 6 Drawing Sheets

USAGE BASED AGGREGATION OPTIMIZATION

RELATED APPLICATIONS

This application is related to the following pending applications, all of which are filed on the same day and assigned to the same assignee as the present application:

"Aggregation Design in Database Services"—Ser. No. 09/338,212, filed Jun. 22,1999, "Aggregation Size Estimation in Relational and OLAP Databases"—Ser. No. 09/338,390, filed Jun. 22,1999, "Aggregation Performance Estimation in Relational and OLAP Databases"—Ser. No. 09/337,751, Jun. 22,1999, "Record for Multidimensional Database"—Ser. No. 09/338,666, Jun. 22, 1999, and "Record for Multidimensional Database With Flexible Pathing"—Ser. No. 09/338,207, Jun. 22,1999.

COPYRIGHT NOTICE AND PERMISSION

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright © 1999, Microsoft, Inc.

FIELD

The present invention pertains generally to computer-implemented databases, and more particularly to summaries of data contained in such databases.

BACKGROUND

Online analytical processing (OLAP) is a key part of most data warehouse and business analysis systems. OLAP services provide for fast analysis of multidimensional information. For this purpose, OLAP services provide for multidimensional access and navigation of data in an intuitive and natural way, providing a global view of data that can be drilled down into particular data of interest. Speed and response time are important attributes of OLAP services that allow users to browse and analyze data online in an efficient manner. Further, OLAP services typically provide analytical tools to rank, aggregate, and calculate lead and lag indicators for the data under analysis.

In this context, a dimension is a structural attribute of a cube that is a list of members of a similar type in the user's perception of the data. Typically, there is a hierarchy associated with the dimension. For example, a time dimension can consist of days, weeks, months, and years, while a geography dimension can consist of cities, states/provinces, and countries. Dimensions act as indices for identifying a particular cell or range of cells within a multidimensional array. Each cell contains a value, also referred to as a measurement.

Databases are commonly queried for summaries of detail data rather than individual data items. For example, a user might want to know sales data for a given period of time without regard to geographical distinctions. These types of queries are efficiently answered through the use of data tools known as aggregations. Aggregations are precomputed summaries of selected detail data that allow an OLAP system or a relational database to respond quickly to queries by avoiding collecting and aggregating detailed data during query execution. Without aggregations, the system would need to scan all of the rows containing the detailed data to answer these queries, resulting in potentially substantial processing delays. With aggregations, the system computes and materializes aggregations ahead of time so that when the query is submitted to the system, the appropriate summary already exists and can be sent to the user much more quickly.

Calculating these aggregations, however, can be costly, both in terms of processing time and in terms of disk space consumed. Several conventional OLAP systems calculate all possible summaries of the data and suffer from substantial inefficiencies when working with large databases having many dimensions. Some other conventional OLAP systems allow the user to select specific pre-calculated aggregations, avoiding the delays associated with calculating all possible aggregations. Selecting an optimal set of aggregations for a given set of queries, however, is a complicated task that most end users would find difficult to perform at best. Still other OLAP systems do not create any aggregations at all. While this approach is workable for small data volumes, it is not efficient for use with large data volumes. Certain other OLAP systems implement algorithms for selecting aggregations, but fail to adequately consider the costs of creating and maintaining the aggregations.

In those system which allow for the design of aggregations, there is generally no assurance that the aggregations designed are ever actually used, nor is there a mechanism to determine which aggregations should be materialized based on how often queries using the aggregations are issued.

Thus there is a need for a system that automatically determines a set of desirable aggregations that reflects how users are actually using the system, and that make efficient use of computing resources based on the actual use of the system.

SUMMARY

The above-mentioned shortcomings, disadvantages and problems are addressed by the present invention, which will be understood by reading and studying the following specification.

The systems and methods described herein implement a usage based optimization system for designing aggregations in an OLAP database system. One aspect of the system is that it collects and maintains data on queries as they are issued to the OLAP system. The data collected on queries includes a frequency count comprising a number of times the query has been issued, an internal representation used to efficiently store and identify the query, an execution time comprising the amount of time the OLAP system took to answer the query, and a user identification of the user who issued the query. The system uses the usage statistics to determine which aggregations are candidates for instantiation.

A further aspect of the system is that the usage statistics determine a weighted benefit/cost ratio that the system uses to determine which of the candidate aggregations should be instantiated. The weighted benefit/cost ratio comprises a measurement of the benefit provided by the aggregation in terms of savings in the number of more detailed rows that would have been scanned in the absence of the aggregation, over the cost in terms of rows needed to store the aggregation. The ratio is weighted by multiplying the benefit by the number of queries that can make use of the aggregation.

A still further aspect of the system is that an administrator can determine which of the usage statistics should influence the weighting of the benefit/cost ratio. For example, in one aspect, the administrator can determine that only the most recently issued queries should be used in the weighting. In a further aspect, the administrator can determine that only queries issued by a particular user should be used in the weighting. In a still further aspect, the administrator can determine that only queries that exceed a certain amount of time should be used in the weighting.

The present invention describes systems, clients, servers, methods, and computer-readable media of varying scope. In addition to the aspects and advantages of the present invention described in this summary, further aspects and advantages of the invention will become apparent by reference to the drawings and by reading the detailed description that follows.

DETAILED DESCRIPTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into five sections. In the first section, the hardware and the operating environment in conjunction with which embodiments of the invention may be practiced are described. In the second section, an exemplary cube for an OLAP system is described. In the third section, a system level overview of the invention is presented. In the fourth section, methods of an exemplary embodiment of the invention are provided. Finally, in the fifth section, a conclusion of the detailed description is provided.

Hardware and Operating Environment

Figure 1:
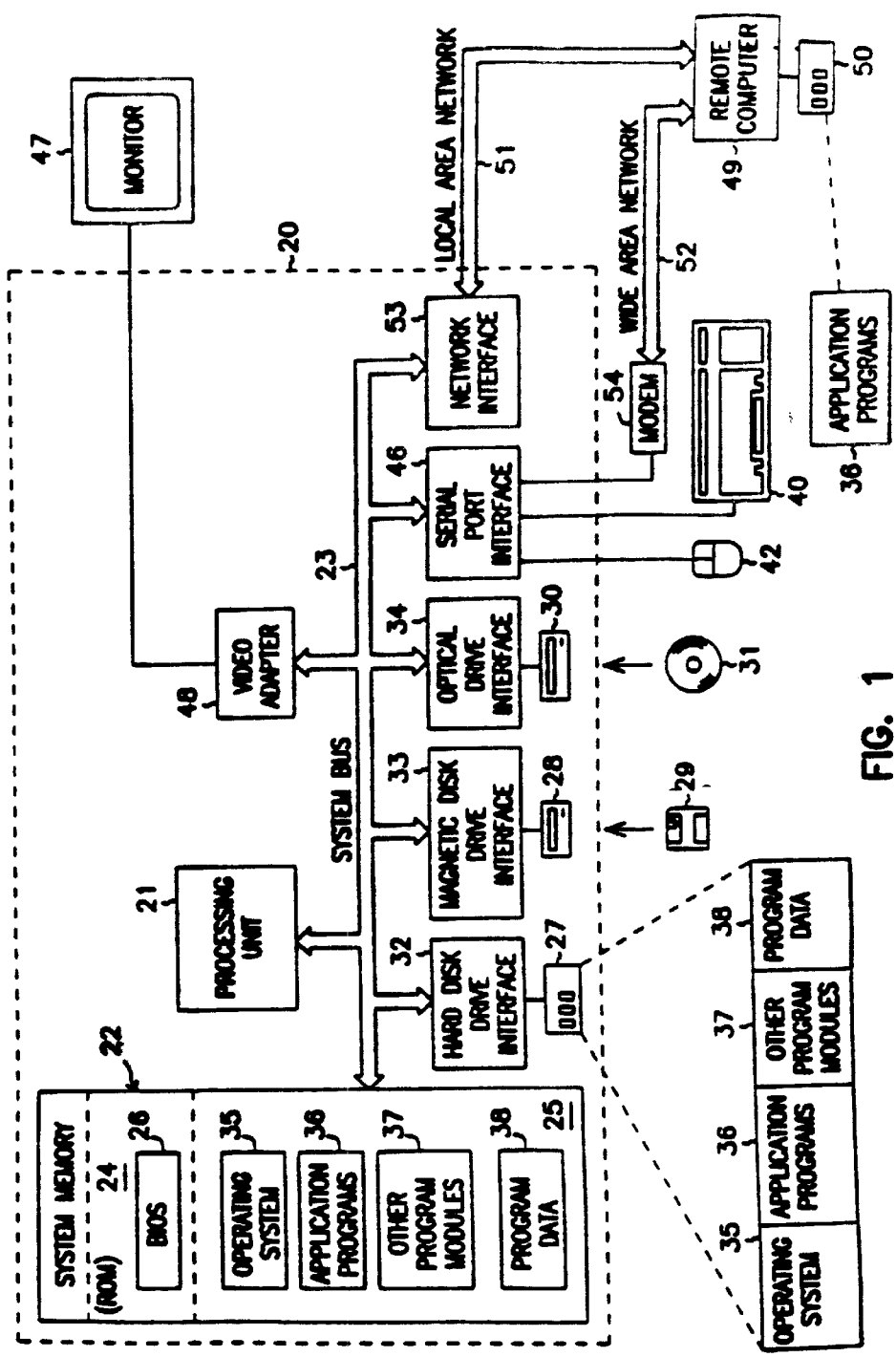
FIG. 1 shows a diagram of the hardware and operating environment in conjunction with which embodiments of the invention may be practiced.

FIG. 1 is a diagram of the hardware and operating environment in conjunction with which embodiments of the invention may be practiced. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components including the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in offices, enterprise-wide computer networks, intranets and the Internet.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple other computers.

Exemplary Cube and Cube Aggregations

In the detailed description that follows, reference will be made to a small, three-dimensional OLAP cube. This cube has a time dimension with four hierarchy levels: year, quarter, month, and day. The second dimension, a products dimension, has six levels: all products, department, category, subcategory, brand, and stock keeping unit (SKU). Finally, a geography dimension also has six levels: whole world, region, country, state, city, and ZIP code. This cube is presented to provide a reference example of the how the systems and methods of the invention operate. It will be appreciated that the OLAP cubes maintained by various embodiments of the invention can have more or fewer dimensions than in this example, and that the OLAP cube can have more or fewer hierarchy levels than in this example.

For an OLAP cube, the number of possible types of aggregations is given by the product of the number of hierarchy levels in each of the dimensions. Thus, considering the OLAP cube described above, a total of 144 (4×6×6) types of aggregations are possible. Optimal performance would be achieved by materializing all of the possible types of aggregations because all of the possible query results would be precomputed. Materializing and maintaining all of these aggregations, however, is costly in terms of both calculation time and disk space. The present invention provides for, among other things, an OLAP system that assists the user in selecting only those aggregations that are actually used, and of the aggregations actually used, the ones that achieve good performance based on the frequency the aggregation is used and the savings in calculation time and disk space provided by the aggregation.

According to one example embodiment of the present invention, system usage data is maintained that tracks use statistics on the queries and aggregations that are actually requested by users of the system. A subset of these aggregations is selected by maintaining weighted benefit/cost ratings for both selected aggregations and aggregations that could potentially be selected, known as candidate aggregations. The weighted benefit/cost rating comprises a raw benefit/cost rating for a particular aggregation, whether selected or candidate, which considers the increase in performance gained by selecting the aggregation and the cost in computing resources of creating and maintaining the aggregation. This raw benefit/cost rating is adjusted according to an aggregation usage factor to produce the weighted benefit/cost ratio. The usage factor can be calculated based on the number of times a query is executed, the length of time the query takes to execute, or it can be calculated according to the user who issued the query. As new aggregations are queried, statistics including aggregation use counts are updated. In addition, weighted benefit/cost ratings are updated and aggregations may be selected or deselected based on the new ratings. The selection and removal of aggregations, in turn, affects the raw and weighted benefit/cost ratings.

As discussed above, aggregations are used to improve the response time of an OLAP system or relational database to queries. Aggregations allow the system to avoid collecting and aggregating detail data when a query is executed. The system computes and materializes aggregations ahead of time so that, by the time a query is issued to the system, the proper summary of the detail data already exists and can be presented to the user quickly.

Aggregations can be used to answer even queries that do not match them exactly. For example, a query from the exemplary cube as to yearly sales of a certain product can be answered using aggregations of sales per year. It is evident, however, that aggregations of sales per month can also be used to answer the query simply by adding aggregated sales data for all of the months in the year of interest. While this operation is not as direct as using an aggregation that matches the query exactly (i.e. a yearly data aggregation), it is still much better than adding sales on, for example, a daily basis. Thus, the raw benefit of an aggregation is that it eliminates, at least in part, the need to retrieve and manipulate more detailed data to answer a query.

It can be observed that the more detailed an aggregation is, the more queries it can answer. For example, monthly aggregations can be used to answer queries relating to both monthly and yearly sales. By contrast, yearly aggregations are not sufficiently detailed to answer queries relating to monthly sales. Yearly aggregations are, however, more time and space efficient than monthly aggregations at answering yearly sales queries. As a general matter, the less detailed an aggregation is, the more efficiently it can answer those queries that it is sufficiently detailed to answer.

One measure of the raw benefit of an aggregation involves comparing the costs of answering the queries with and without the existence of the aggregation. Cost can be measured in a variety of ways. Some systems measure cost in terms of the estimated time required to answer the query. Other systems measure consumption of computing resources, and still others might measure cost in other ways. It is well known in the art that a direct relationship exists between the size of an aggregation and the cost involved in querying it. Therefore, the size difference between aggregations is used to measure the raw benefit of an aggregation. This raw benefit is then adjusted by an aggregation usage factor to produce a weighted benefit according to a particular embodiment of the present invention. Because the size of an aggregation is independent of external variables, such as processor speed, aggregation size is a particularly advantageous cost metric.

Using this metric, the raw benefit of an aggregation from a specific query is the number of rows of the database that will not be scanned due to the use of the aggregation. The benefit that can be derived by selecting a particular aggregation depends substantially on the other aggregations that have already been selected. For example, if the detailed sales data for a particular product family contains 1,000,000 rows, then selecting the product family-year-state aggregation, i.e., the aggregation of sales of product families per year per state, is greatly beneficial if no other aggregations exist. The raw benefit of selecting the product family-year-state aggregation can be expressed as the difference in sizes between the product family-year-state aggregation (one row) and the detailed data (1,000,000 rows), or 999,999. If, however, the product family-month-state aggregation has already been selected, the raw benefit of also selecting the product family-year-state aggregation is greatly diminished because this aggregation only avoids scanning twelve rows. In this case, the raw benefit of selecting the product family-year-state aggregation can be expressed as the difference in size between the product family-year-state aggregation (one row) and the product family-month-state aggregation (twelve rows), or 11. As a general matter, the raw benefit of an aggregation can be expressed as the difference between (1) the number of rows needed to answer the queries it can answer best and (2) the number of rows needed to answer those queries using the "second best" aggregation for each such query. If no "second best" aggregation exists, the number of detailed rows is substituted for the latter quantity. An aggregation can answer a query if it contains sufficiently detailed information for answering the query. For example, as discussed above, a monthly aggregation can answer a query for yearly sales data, but a yearly aggregation cannot answer a query for monthly sales data.

As mentioned above, the weighted benefit of an aggregation depends on the raw benefit of the aggregations and the frequency the aggregation can be used to answer queries. For example, an aggregation may have a high raw benefit/cost ratio, but if the aggregation answers queries that are issued relatively rarely, its actual impact on the performance of the system will be negligible. On the other hand, an aggregation may have a relatively low raw benefit/cost ratio, but if the aggregation answers many queries, the impact on the performance of the system may be great. In this situation, it is desirable to materialize the aggregation having the lower raw benefit/cost ratio, but higher frequency of use. The weighted benefit/cost ratio determined in various embodiments of the invention reflects this concept.

Thus, an aggregation is considered "best" to answer a query if it is able to answer a query, and its weighted benefit in terms of size and frequency of use is greater than the benefit provided by any other aggregation that can answer the query. Similarly, a "second best" aggregation is the aggregation having the next largest weighted benefit in terms of size and frequency of use that can answer the query. For example, assume the facts in the following table:

TABLE 1

| Aggregation | Size (S) | Raw Incremental benefit (I) | Frequency of Use (F) | Weighted Benefit = I/S * F |
|---|---|---|---|---|
| family-year-state | 1 | 3 | 100 | 300 |
| family-quarter-state | 4 | 8 | 1000 | 2000 |
| family-month-state | 12 | 353 | 10 | ~294 |

Given these aggregations, the "best" and "second best" aggregations to answer a query for yearly sales data are the product family-quarter-state and product family-year-state aggregations. To answer a query for quarterly sales data, the "best" and "second best" aggregations are the product family-quarter-state and product family-month-state aggregations. It should be noted that the product family-year-state aggregation is not considered, because it does not contain sufficiently detailed information to answer the query.

Just as the raw benefit of an aggregation can be measured in a variety of ways, the cost of an aggregation can also be measured with a variety of metrics. Some systems calculate the cost in terms of the processing time required to materialize the aggregation, while others measure cost using different measures of computing resource consumption. As with measuring the benefit of an aggregation, however, cost is advantageously measured using the size of the aggregation as a metric, according to an embodiment of the present invention. This metric is particularly advantageous because the cost of storing the aggregation remains constant over time, while the processing effort involved in materializing the aggregation is transient and lasts only while the aggregation is being materialized.

The size of an aggregation can be determined in any of a variety of ways. One particular approach is disclosed in co-filed, co-pending and pending application Ser. No. 09/338,390 filed Jun. 22, 1998 and entitled "Aggregation Size Estimation in Relational and OLAP Databases" which is assigned to the instant assignee. It should be noted, however, that any size estimation technique can be used consistent with the present invention. In a particular implementation, aggregation size is expressed in terms of rows rather than bytes because this measure ensures that performance gains and aggregation costs are expressed in similar terms.

The concepts described in this section, including determining the raw and weighted benefit and costs of materializing aggregations will be described in further detail in the sections that follow.

System Level Overview

Figure 2:
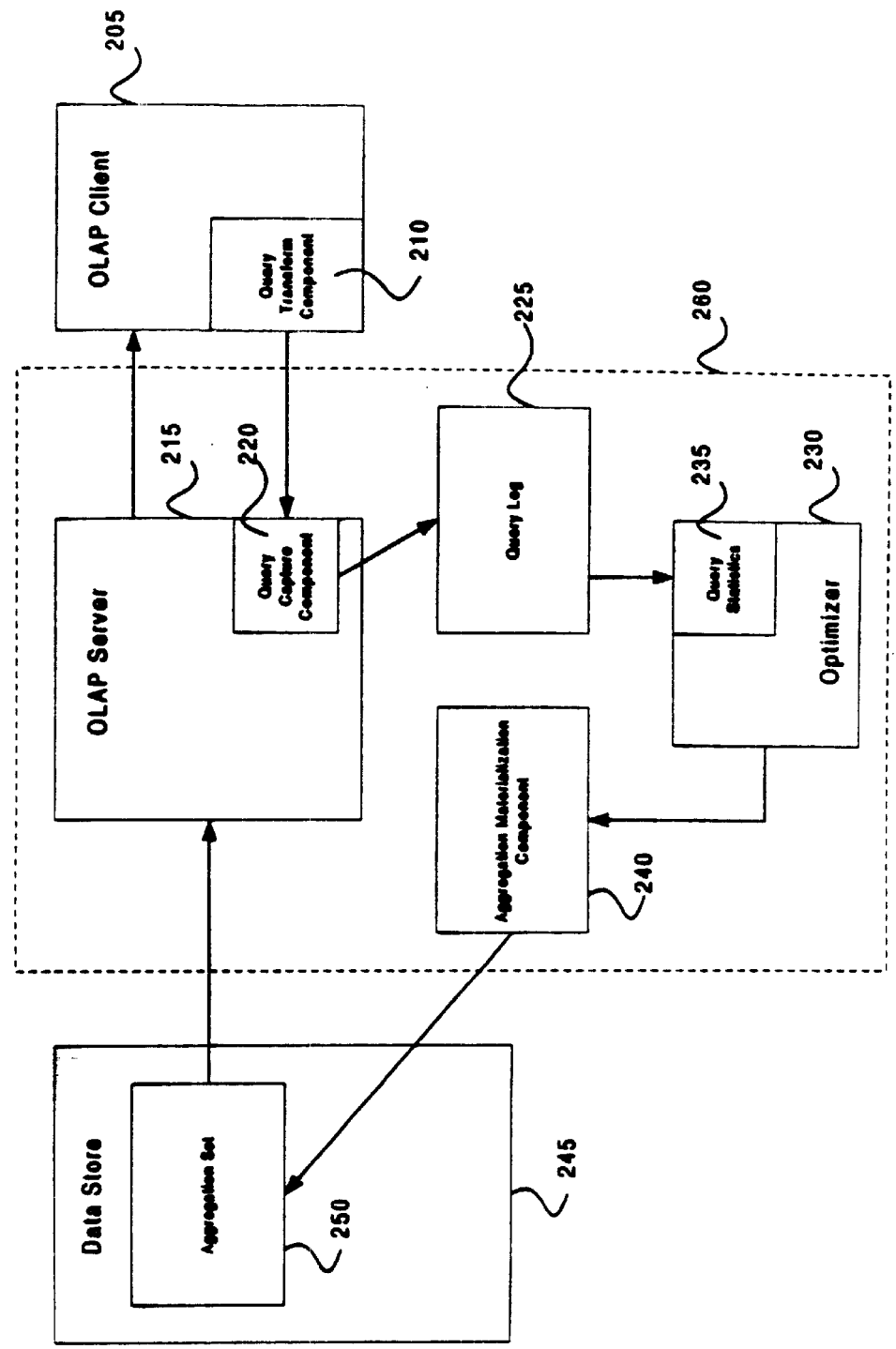
FIG. 2 is a diagram illustrating a system-level overview of exemplary embodiments of a usage based optimization system.

A system level overview of the operation of an exemplary embodiment of the invention is described by reference to FIG. 2. The concepts of the invention are described as operating in a multiprocessing, multithreaded virtual memory operating environment on a computer, such as computer 20 in FIG. 1. The operating environment includes an OLAP client 205, OLAP system 260, and data store 245, all of which operate on cubes such as the cube described in the previous section.

OLAP client 205 is an application program that requires the services of an OLAP system. OLAP client 205 can be any type of application that interacts with the OLAP system, for example, a data mining application, a data warehousing application, a reporting application etc.

OLAP client 205 typically interacts with OLAP system 260 by issuing OLAP queries. Using the dimensions in the cube described above as an example, OLAP client 205 may request the sales in "Quarter 1 of 1997 in the cities of Washington USA of food specific products." In one embodiment of the invention, OLAP client 205 has a query transform component 210 that transforms the query into a normalized form before the query is issued to the OLAP system 260. The normalized form for a query represents the granularity level of the cells required to answer the query. The granularity level is represented as a list of levels, one for each dimension in the cube. The level is the cell's level in the hierarchy of the dimension. For example, in the query above, the granularity at each dimension is Quarter, City, and Brands. The normalized form for a query will be described in further detail below After normalizing the query, the query transform component forwards the request to the OLAP system 260, which will process the query and return one or more cells from the cube that answers the query.

Queries generated by OLAP client 205 will frequently require the OLAP system 260 to return cells having multiple levels of granularity. For example, consider a query requesting sales in "Quarter 1 of 1997 for each state in the USA and its cities of different brands." The OLAP system 260 will return cells at two levels, the level of Quarter, State, and Brands and the level of Quarter, City, and Brands. In one embodiment of the invention, the query transform component divides the query into multiple sub-queries, each of which will return one or more cells at the same granularity level. For example, the query mentioned above will be divided into the queries:

"Quarter 1 of 1997 in the cities of USA of different brands"; and

"Quarter 1 of 1997 in the states of USA of different brands".

These queries are then submitted to the OLAP system 260 for processing, which can either resolve the queries independently, or resolve them in a combined operation.

OLAP system 260 receives and processes queries from applications such as client application 205. OLAP system 260 is comprised of multiple components, including OLAP server 215, optimizer 230, and aggregation materialization component 240. In one embodiment of the invention, OLAP system 260 is a version of the SQL Server 7.X OLAP Services product available from Microsoft Corporation.

OLAP server 215 receives queries and controls the processing of queries. In one embodiment of the invention, a query capture component (QCC) 220 receives queries from applications such as OLAP client 205 after query transform component 210 has transformed the user's query as described above. However, in alternative embodiment of the invention, the query transform component is part of OLAP system 260. In this embodiment, a user's query is transmitted to the OLAP server 215, transformed by the query transform component 210 and then passed to the QCC 220. In a further embodiment of the invention, QCC 220 receives the query first, and then the query is transformed by query transform component 210.

After receiving a query, the QCC 220 saves information regarding the query to a query statistics log 225. The log record saved for each query includes, but is not limited to the following data:

Date/Time of query arrival.

The query details.

The time it took to answer the query.

The method used to answer the query (cache, multidimensional store, relational store or combination).

The user who submitted the query.

In one embodiment of the invention, the query statistics log 225 is a table in a relational database such as a database contained in data store 245, or in an independent data store. However, the invention is not limited to any particular format for storing the information, and the log 225 can exist on any type of computer-readable media. For example, the log 225 can be stored in a file resident on a disk.

It is desirable that the QCC 220 be connected to an OLAP session that is established between OLAP client 205 and OLAP server 215 so that it can record or log the time a query is accepted by the server and the time that the query is answered. This is desirable because it provides a means for QCC 220 to maintain accurate data on the length of time it took to answer the query.

The capturing and saving of query information by QCC 220 introduces overhead to the system. In order to control and reduce the overhead, one embodiment of the invention provides for QCC 220 to be configured to capture all, some, or none of the incoming queries. In an embodiment of the invention where the OLAP system 260 is the SQL Server OLAP Services, a system administrator or database administrator sets a parameter that indicates the system is to capture one out of every X queries, where X is the parameter. If the parameter is set to one, all queries are captured. If the parameter is set to ten, only every tenth query is captured to the log. Finally, if the parameter is zero, then no queries are saved to the log 225. Those skilled in the art will appreciate that other mechanisms for controlling the number of queries that are saved to log 225 are possible and within the scope of the invention.

The query detail field of the log record contains a representation of the normalized granularity level associated with the query. In one embodiment of the invention, the granularity level is composed of a string of characters in which each position in the string represents a particular dimension, and the character at a position is an ordinal of the level in the dimension. For example, in the exemplary cube, the first character position represents the time dimension, the second the product dimension and the third the geography dimension. Thus the detail field for the sub-query having a granularity level of Quarter, City, Brand would contain the string "255" ($2^{nd}$ level of the time dimension, $5^{th}$ level of the products dimension, and $5^{th}$ level of the geography dimension). Similarly, the sub-query having a granularity level of Quarter, State, Brand would be represented by the string "254" ($2^{nd}$ level of the time dimension, $5^{th}$ level of the products dimension, and $4^{th}$ level of the geography dimension). If more than ten dimensions are present, characters other than the characters "0"–"9" can be used to represent levels ten and above. For example, the character "A" could be used to represent 10, "B" to represent 11 and so on.

It is desirable to use the representation described above because it allows for granularity to be both normalized and expressed in a space-efficient manner. In addition, the format can be used to represent the design of an aggregation in addition to query details. However, the invention is not limited to such a representation, and those of skill in the art will recognize that other representations are possible and within the scope of the invention.

Optimizer 230 uses the data stored in the query statistics log 225 and the methods described in the next section to design and select aggregations that are then maintained by the system for use in answering queries. In general, optimizer 230 selects a subset of the data stored in log 225 and maintains the subset in query statistics 235. In the embodiment of the invention where log 225 is stored as a table in a relational database, optimizer 230 queries the table using standard SQL in order to populate and maintain query statistics 235.

The optimizations performed by the system will depend on the subset of statistics log 225 selected and maintained in query statistics 235. For example, to design aggregations that are optimized for a particular user, only those records in query statistics log 225 that were issued by the user are selected and placed in query statistics 235. Similarly, to design aggregations that optimize queries that take a long time to execute, only those records in query statistics log 225 where the query time exceeds a particular threshold are selected. Other optimizations, such as optimizing for the most recent queries or the most frequently issued queries are also possible and within the scope of the invention.

In one embodiment of the invention, a user interface is provided that allows a DBA to define the subset of queries that optimizer 230 uses to gather the subset of query statistics 235 from query log 225.

In general, optimizer 230 uses the data in query statistics to determine a domain of candidate aggregations that may be beneficial to materialize. The raw benefit/cost ratios of the candidate aggregations are determined, and then weighted according to the frequency count maintained in query statistics 235 to produce a weighted benefit/cost ratio. The optimizer then selects those aggregations having a comparatively high weighted benefit/cost ratio and causes aggregation materialization component 240 to materialize the aggregations in data store 245 as aggregation set 250.

Data store 245 provides for the persistent storage of aggregations and other data used by the OLAP system 260. In one embodiment of the invention, data store 245 is a relational database such as SQL Server that is dedicated for use by OLAP system 260. In an alternative embodiment of the invention, data store 245 is a relational database such as SQL Server, Informix, Oracle or Sybase that, in addition to aggregation data, is used to store the detail data that is aggregated by the OLAP system 260. However, the invention is not limited any particular database system or database configuration.

Methods of an Exemplary Embodiment of the Invention

In the previous section, a system level overview of the operation of an exemplary embodiment of the invention was described. In this section, the particular methods of the invention performed by an operating environment executing an exemplary embodiment are described by reference to a series of flowcharts shown in FIGS. 3–6. The methods to be performed by the operating environment constitute computer programs made up of computer-executable instructions. Describing the methods by reference to a flowchart enables one skilled in the art to develop such programs including such instructions to carry out the methods on suitable computers (the processor of the computer executing the instructions from computer-readable media). The methods illustrated in FIGS. 3–6 are inclusive of the acts required to be taken by an operating environment executing an exemplary embodiment of the invention.

Figure 3:
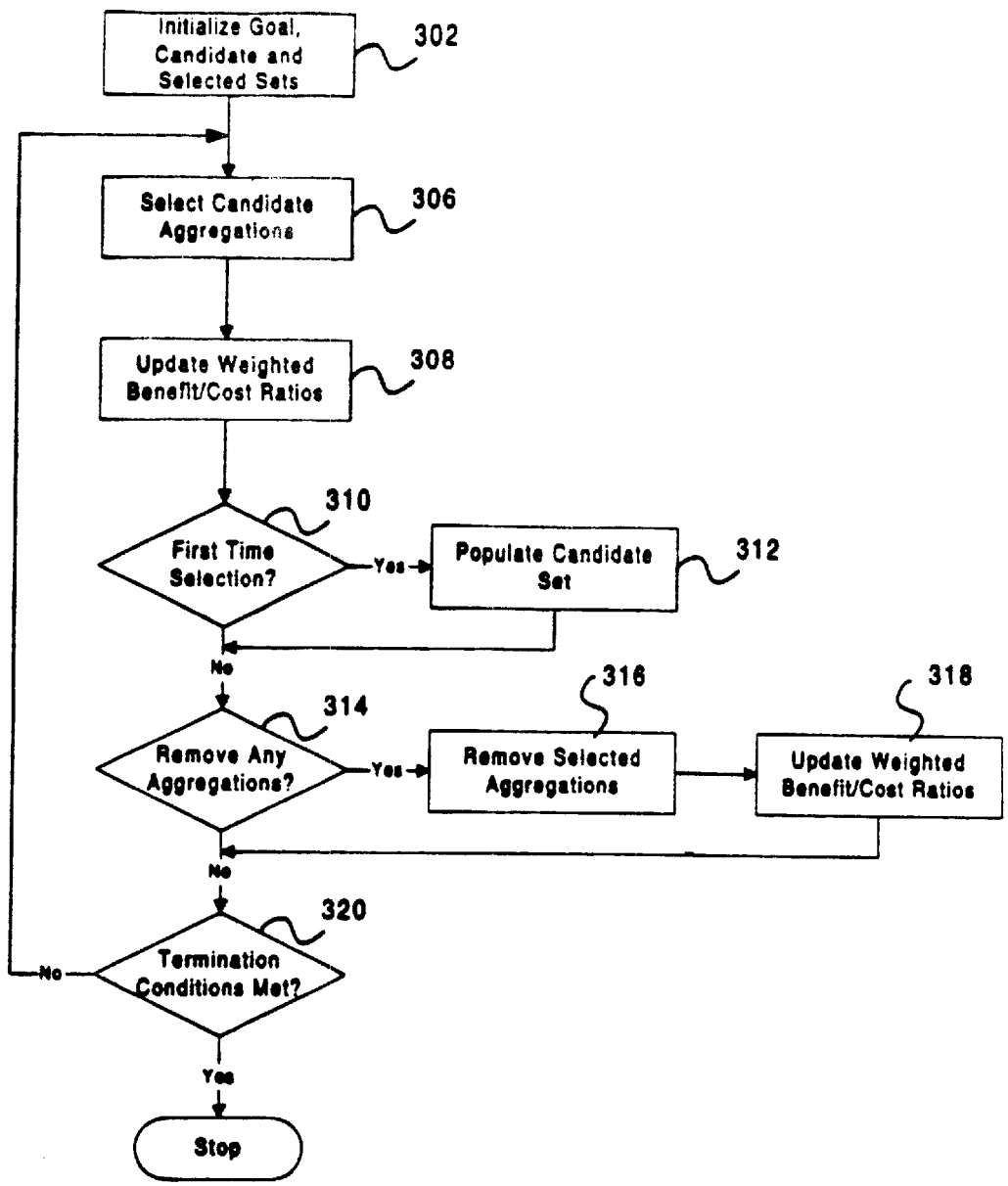
FIG. 3 is a flowchart illustrating an iterative method for selecting aggregations, according to an embodiment of the invention.

An example iterative method 300 of selecting aggregations according to an implementation of the present invention is shown in FIG. 3. Two sets of aggregations play a role in the method 300: candidate aggregations and selected aggregations. As the method 300 progresses, aggregations are moved between the candidate and selected sets in a gradual manner. The candidate and selected sets are comprised of aggregations that are determined in accordance with queries submitted to the system. The manner in which the selected set is changed gradually increases the size of the selected aggregations while improving performance gain, as measured in the number of row scans saved and weighted by the number of times queries using the aggregation are issued. In this embodiment, the name of a candidate aggregation to be selected is actually materialized only when it is actually needed for evaluating the cost and raw benefit of the candidate aggregation. Delaying materializing the name of the candidate aggregation conserves computing resources and allows the method 300 to scale up well to databases for which there are many possible aggregations.

The method begins at block 302, where the system initializes a goal query set, the candidate set and the selected set. The goal query set is determined by selecting queries issued by users found in query statistics 235 (FIG. 2). Thus, the goal query set will comprise a set of aggregations that are known be used in the resolution of queries. Each query in the goal query set is represented by an entry that contains the granularity level described above in reference to FIG. 2, and a frequency count of the number of times the granularity level was used to satisfy a query. The frequency count is determined by analyzing the query log 225 for the number of times the query appears in the log. In one embodiment of the invention, the goal query entry also includes the cost in terms of time or CPU resources of queries that use the granularity level of the entry. Every aggregation in the goal set is initially a candidate aggregation that may be selected and moved from the candidate set to the selected set. Later, if the system determines that the usefulness of the selected aggregation is not as high as some candidate aggregation, it moves the selected aggregation from the selected set back into the candidate set. It should be noted that the aggregation is moved into the candidate set because it might be reselected at some point in the future.

The candidate list is initialized using a root aggregation, which is the highest level aggregation that aggregates the topmost hierarchy level from each dimension. For example, the root aggregation in the operational example is an all products-year-world aggregation. The root aggregation can only answer one type of query in the exemplary cube, a query relating to worldwide sales data for all products during a particular year. For this type of aggregation, however, the potential raw benefit of the root aggregation is great, as it is the difference between the aggregation cost and the cost of querying detailed facts, which can include millions of rows. While other possible aggregations could be inserted into the candidate set during initialization, inserting them is not necessary because at initialization, the best weighted (and raw) benefit/cost ratio is with the smallest aggregation, i.e., the root aggregation.

Figure 6:
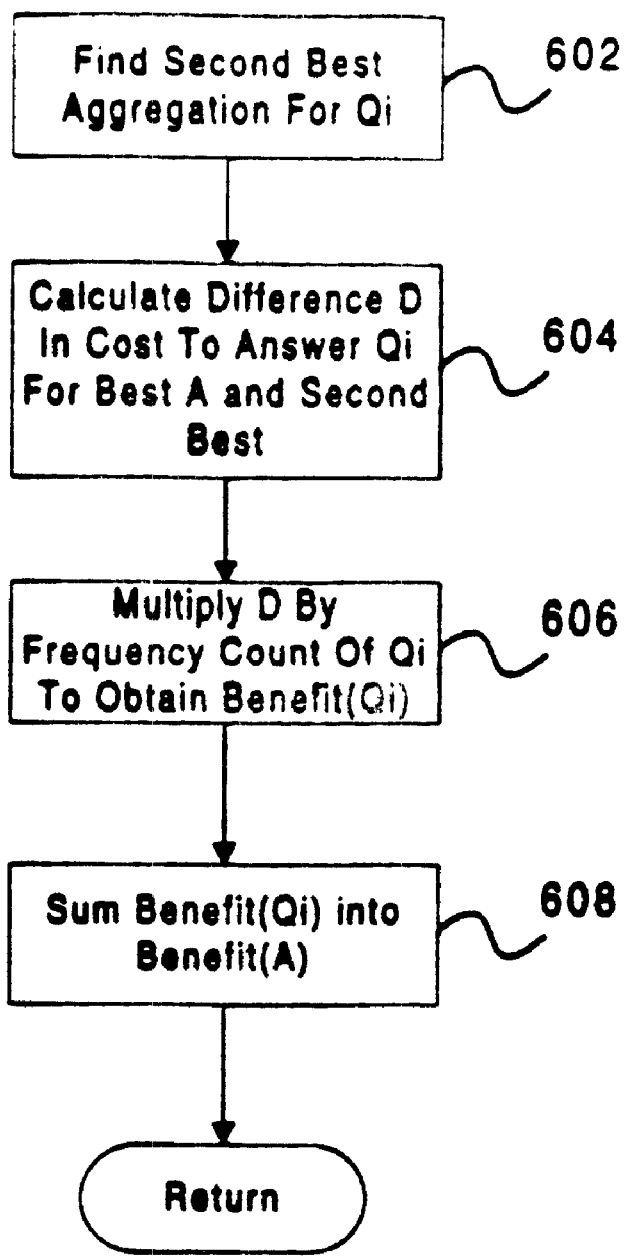
FIG. 6 is a flowchart illustrating a process for calculating the weighted benefit of an aggregation according to an embodiment of the invention.

The calculation of weighted benefit is slightly different for candidate aggregations vs. selected aggregations. FIG. 6 illustrates a method for calculating the weighted benefit "B" of a particular candidate aggregation "A". The method is executed for each query "q" from a set of queries $Q_A$ that aggregation A is the best to answer, and determines the benefit "b" of each query. An aggregation is "best" if it has the highest weighted benefit/cost ratio.

The method begins at block 602, where the cost of the second best aggregation for q is found. If there is no current second best aggregation, the cost is the number of rows in the fact table for the aggregation. Next, at block 604 the system calculates the difference D in the cost to answer q between the between the best and second best aggregation. The system then retrieves the frequency count of the query from the query statistics and multiplies D by the frequency count at block 606. Finally, at block 608 the system sums the results of the multiplication into total benefit for A.

For selected aggregations, an actual weighted benefit measure, rather than a potential weighted benefit measure, is maintained. The weighted benefit measure describes the additional computation cost that would be incurred if the selected aggregation were removed from the selected set, multiplied by the number of times that queries using the aggregation have been issued. The weighted benefit is calculated as the sum, for each of the queries for which the selected aggregation is the "best" aggregation, of the differences in cost between (1) using the selected aggregation to answer each respective query and (2) using the "second best" selected aggregation to answer the query, multiplied by the number times the queries were issued. Because this measure compares the "best" and "second best" aggregations for answering queries, it is particularly helpful to maintain a list of the "best" and "second best" aggregations for answering each query. Keeping constant track of the potential weighted benefit of candidate aggregations and the actual weighted benefit of selected aggregations is important in allowing the method 300 to scale up to large databases.

Returning to FIG. 3, the candidate aggregation with the highest weighted benefit/cost ratio is selected from the set of candidate aggregations and moved to the selected set, as depicted at a block 306. In order to avoid costly searches for the candidate aggregation having the highest weighted benefit/cost ratio, it is recommended that the candidate list be maintained sorted or indexed by the weighted benefit/cost ratio. Before this candidate aggregation has been selected, the weighted benefit/cost ratings of the aggregations, candidate and selected, that are affected by the selection of this candidate aggregation are updated.

Figure 4:
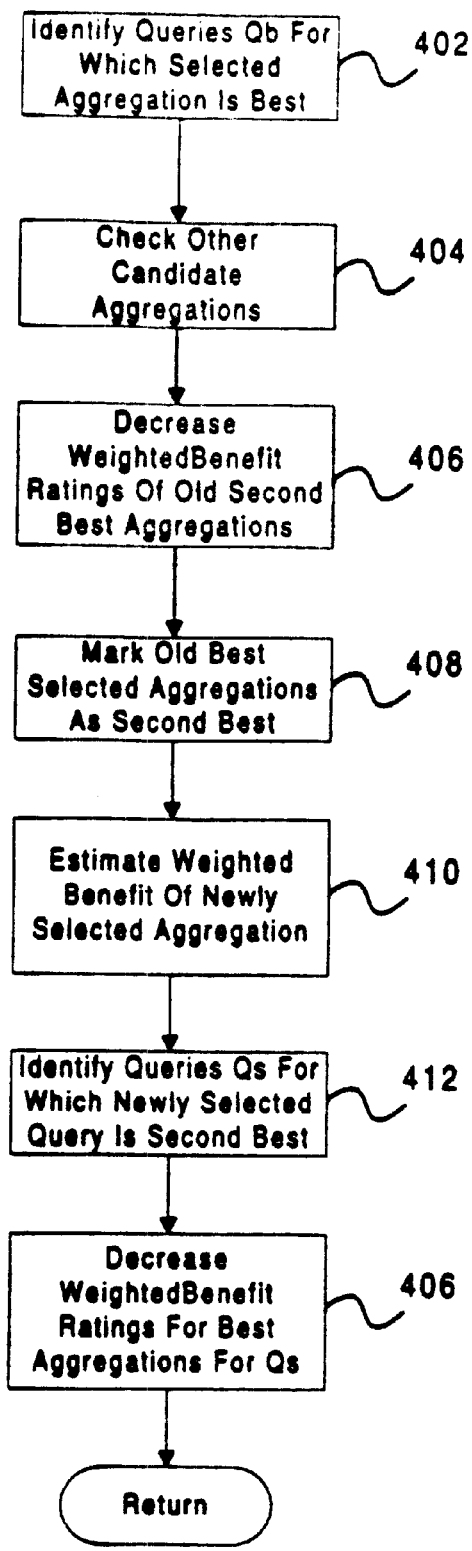
FIG. 4 is a flowchart illustrating a process for updating weighted benefit/cost ratings in response to selection of an aggregation, according to another embodiment of the invention.

FIG. 4 is a flowchart illustrating the update process in greater detail. First, at a block 402, all of the queries $Q_b$ in the goal query set for which the newly selected aggregation becomes the "best" aggregation for answering are identified. Next, at a block 404, the system checks each of the candidate aggregations that can answer the queries $Q_b$ to determine whether its potential weighted benefit should be decreased because it might be smaller than the newly selected aggregation, which is now the new "best" aggregation for these queries.

As depicted at a block 406, the system then decreases the weighted benefit rating of each of the old "best" selected aggregations for the queries $Q_b$ because they are no longer the best aggregations for answering the queries $Q_b$. In other words, if the old "best" aggregations are removed, there would be no degradation in performance for the queries $Q_b$. The weighted benefit is decreased by the cost difference between the old "best" and the old "second best", multiplied by the number of times the queries $Q_b$ were used.

The old "best" aggregations are then identified as "second best" aggregations for the queries $Q_b$, as depicted at a block 408. Next, at a block 410, the weighted benefit of the newly selected aggregation is calculated as the sum over all of the queries $Q_b$ of the cost differences, e.g., size differences, between the old "best" (new "second best") aggregation and the newly selected aggregation, multiplied by the number of times each query in $Q_b$ was issued.

Certain other selected aggregations may also decrease in benefit because, while they are still the best aggregations for some queries, the newly selected aggregation may be almost as good for answering those queries. To account for this consideration, the system at a block 412 identifies the queries $Q_s$ for which the newly selected aggregation is the "second best", that is, the aggregation with the next best weighted benefit/cost ratio for answering. The system decreases the weighted benefit rating of each of the "best" selected aggregations for answering the queries $Q_s$ because the performance degradation of removing them from the selected set will be lower due to the newly selected aggregation. The newly selected aggregation is a better "second best" aggregation for answering the queries $Q_s$ than the old "second best" aggregations. Therefore, at a block 414, the weighted benefit rating for each of the "best" aggregations for answering the queries $Q_s$ is decreased by the difference between the cost of the old "second best" aggregation and the cost of the newly selected aggregation, multiplied by the number of times the queries in $Q_s$ were used.

The newly selected aggregation is then moved to the selected set. In order to allow the system to scale up to large numbers of possible combinations, it is important to keep track of the changes in weighted benefit discussed above in connection with FIG. 4 only on those aggregations that are affected by the selection of the newly selected aggregation.

Referring again to FIG. 3, after the update process depicted in FIG. 4 has been performed, the system determines, at a decision block 310, whether the newly selected aggregation was selected for the first time. If so, the candidate set is populated with the names of all of the aggregations that are one step more detailed than the newly selected aggregation, as depicted at a block 312. To populate the candidate set, each dimension is considered. If the hierarchy level of the dimension in the newly selected aggregation is not the most detailed level, a new aggregation is constructed that has the same hierarchy levels for the other dimensions as the newly selected aggregation. The new aggregation, however, uses a hierarchy level that is one step more detailed for the dimension under consideration. For example, in the operational example, the first candidate aggregation to be selected is the root aggregation, which is an all products-year-world aggregation. The newly constructed aggregations would then be department-year-world, all products-quarter-world, and all products-year-region aggregations. Finally, each of the newly constructed aggregations that is in neither the candidate nor the selected set is added to the candidate set. Dynamically adding candidate aggregations in this manner rather than creating all possible aggregations at the outset is an optimization technique that allows the system to scale up more efficiently.

As discussed above in connection with block 406 of FIG. 4, the insertion of a newly selected aggregation into the selected set can cause the raw benefit of the old "best" aggregations, which are now "second best" aggregations, to decrease, thereby also causing the weighted benefit to decrease. In some cases, the raw and weighted benefit of a specific selected aggregation may decrease sufficiently such that the second best candidate aggregation might actually have a better potential weighted benefit/cost ratio. In this case, the selected set would be better in terms of weighted benefit/cost ratio if the selected aggregation with the lowest weighted benefit/cost ratio is removed from the selected set back into the candidate set. Thus, at a decision block 314 of FIG. 3, the system determines whether any selected aggregations should be deselected and moved back to the candidate set. In particular, the selected aggregations that have a weighted benefit/cost ratio lower than the next best candidate aggregation's potential weighted benefit/cost ratio are removed at a block 316.

Before a selected aggregation is removed to the candidate set, the weighted benefit/cost ratings of the aggregations, candidate and selected, that are affected by the removal of this selected aggregation are updated.

Figure 5:
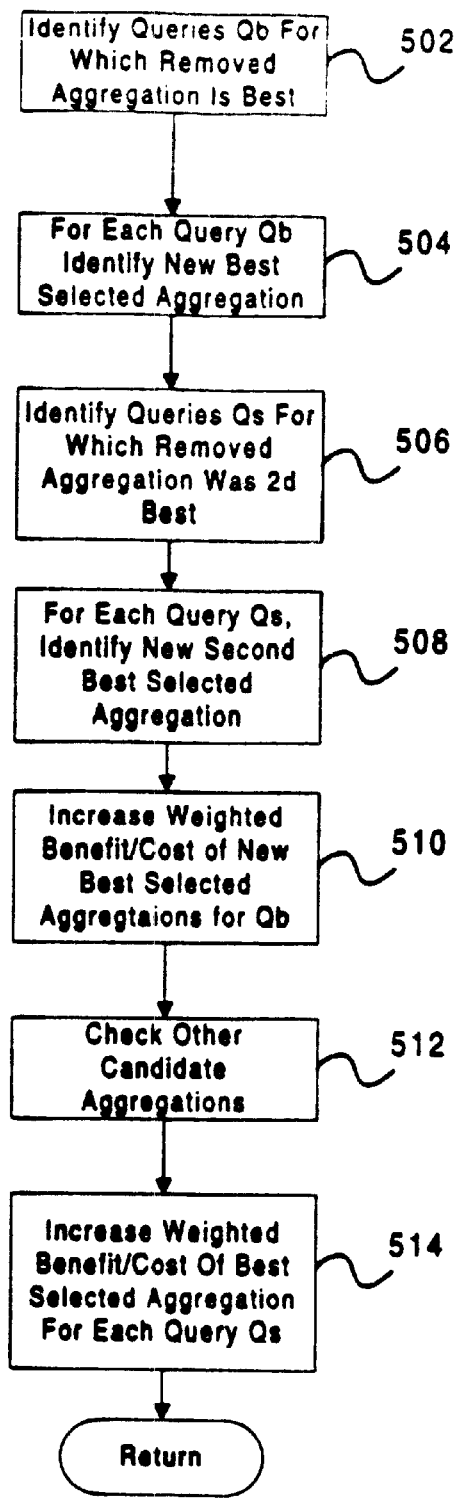
FIG. 5 is a flowchart depicting a process for updating weighted benefit/cost ratings in response to removal of a selected aggregation, according to still another embodiment of the invention.

FIG. 5 is a flowchart illustrating the update process in greater detail. First, at a block 502, all of the queries $Q_b$ for which the newly removed aggregation was the "best" aggregation are identified. Next, at a block 504, the system identifies, for each query $Q_b$, the new "best" selected aggregation, i.e., the "best" selected aggregation in the absence of the newly removed aggregation, and the new "second best" selected aggregation. It will be appreciated that, for a particular query $Q_b$, the new "best" selected aggregation is the old "second best" aggregation. As depicted at a block 506, the system then identifies all of the queries $Q_s$ for which the newly removed aggregation was the "second best" aggregation and, for each query $Q_s$, identifies the new "second best" aggregation, as shown at a block 508.

The raw and weighted benefit ratings of the new "best" selected aggregations for the queries $Q_b$ are increased because these aggregations are now the best aggregations for answering the queries $Q_b$. This updating process is depicted at a block 510. The weighted benefit ratings are increased because, if the new "best" aggregations are removed, performance for the queries $Q_b$ will be degraded. Specifically, the amount of increase in the weighted benefit rating is the size or cost difference between the new "best" and the new "second best" aggregations, multiplied by the number times that queries using the aggregation have been issued.

Next, at a block 512, the system checks each of the other candidate aggregations that can answer the queries $Q_b$ to determine whether their potential weighted benefit should be increased because they might now be smaller than the new "best" aggregations for these queries $Q_b$. If so, the potential weighted benefit rating is increased by the size or cost difference between the newly removed aggregation and the new "best" aggregation, multiplied by the number of times the queries in $Q_b$ have been issued.

Finally, at a block 514, the weighted benefit of the "best" selected aggregation for each query $Q_s$ is increased because the performance degradation associated with removing it is greater. The amount of the increase in the benefit rating is the size or cost difference between the old "second best" aggregation and the new "second best" aggregation, multiplied by the number of times queries $Q_s$ have been issued.

The newly selected aggregation is then moved to the selected set. In order to allow the system to scale up to large numbers of possible combinations, it is important to keep track of the changes discussed above in connection with FIG. 4 only on those aggregations that are affected by the selection of the newly selected aggregation.

The newly removed aggregation is then moved to the candidate set. In order to allow the system to scale up to large numbers of possible combinations, it is important to keep track of the changes discussed above in connection with FIG. 5 only on those aggregations that are affected by the selection of the newly removed aggregation.

Referring again to FIG. 3, after the update process depicted in FIG. 5 has been performed, flow proceeds to a decision block 320, where the system determines whether termination conditions have been satisfied. For example, one termination condition might be user termination of the aggregation selection method. Another termination condition might be the attainment of a predetermined cost threshold. Yet another termination condition might be consideration of all queries in the goal set. If any applicable termination conditions have been satisfied, the process stops. If not, the system returns to the block 306, and another candidate aggregation is selected. The process repeats iteratively until the termination condition or conditions have been satisfied.

By taking the cost of creating and maintaining aggregations into account, the present invention allows the user to achieve a balance between cost and performance that is best suited for the particular application and operating environment. Efficient use of computing resources is thus facilitated. Further, the techniques described herein can be used to quickly and efficiently select a set of aggregations even in OLAP cubes having many dimensions and levels.

Conclusion

The design of aggregations in an OLAP system based on actual usage statistics has been described. The systems and methods of the invention provide advantages not found in previous systems. For example, aggregations are instantiated based on actual patterns of use, an administrator need not guess at what aggregations might be useful. In addition, aggregations are instantiated based on the benefit the aggregation provides and the number of times the aggregation can be used by queries that have been issued. The use of usage statistics provides for a system that automatically determines an optimal set of aggregations to instantiate. As system usage patterns change over time, the set of aggregations can also change in an automatic manner.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. For example, those of ordinary skill within the art will appreciate that while the systems and method have been described in the context of an OLAP system, the systems and method of the invention can be applied to relational database systems and other data storage systems. The terminology used in this application with respect to optimizing aggregations based on usage statistics is meant to include all of these environments. Therefore, it is manifestly intended that this invention be limited only by the following claims and equivalents thereof.

We claim:

1. A method for determining an aggregation to instantiate, the method comprising:

maintaining a set of usage statistics on a plurality of queries;

determining a set of aggregations that can provide at least a part of an answer to the plurality of queries;

using the set of usage statistics to determine at least one aggregation from the set of aggregations to instantiate.

2. The method of claim 1, wherein maintaining a set of usage statistics comprises maintaining a frequency count of the number of times each query in the plurality of queries is issued.

3. The method of claim 1, wherein maintaining a set of usage statistics comprises maintaining a query execution time for each query in the plurality of queries.

4. The method of claim 1, wherein maintaining a set of usage statistics comprises maintaining a user identification for each query in the plurality of queries.

5. A method for determining an aggregation to instantiate, the method comprising:

maintaining a set of usage statistics on a goal set comprising a plurality of queries;

maintaining a set of candidate aggregations selected according to an ability for the aggregation to answer at least one query in the goal set;

maintaining a set of selected aggregations that are currently instantiated;

for each candidate aggregation in the set of candidate aggregations performing the tasks:

determining a raw benefit-cost ratio for the candidate aggregation, said raw benefit-cost ratio comprising a performance improvement attributable to the aggregation, determining a weighted benefit-cost ratio by adjusting the raw benefit-cost ratio according to a usage statistic from the set of usage statistics, said usage statistic associated with a query from the plurality of queries that can be answered by the aggregation; and moving the aggregation from the set of candidate aggregations to the set of selected aggregations when the weighted benefit-cost ratio exceeds the weighted benefit-cost ratio of the other aggregations in the set of candidate aggregations.

6. The method of claim 5, wherein the raw benefit-cost rating for an aggregation is determined as a function of at least one of a size of the aggregation and a size of another aggregation.

7. The method of claim 5, wherein maintaining a set of usage statistics comprises maintaining a frequency count of the number of times each query in the plurality of queries is issued.

8. The method of claim 5, wherein maintaining a set of usage statistics comprises maintaining a query execution time for each query in the plurality of queries.

9. The method of claim 5, wherein maintaining a set of usage statistics comprises maintaining a user identification for each query in the plurality of queries.

10. The method of claim 5, wherein set of candidate aggregations is sorted in order of the weighted benefit-cost ratings associated with each aggregation in the set of candidate aggregations.

11. The method of claim 5, further comprising selecting the candidate aggregation having the highest weighted benefit/cost rating from the set of candidate aggregations and moving the candidate aggregation to the set of selected aggregations.

12. The method of claim 5, further comprising removing an previously selected aggregation from the set of selected aggregations to the set of candidate aggregations when an aggregation having a higher weighted benefit-cost ratio is moved from the set of candidate aggregations to the set of selected aggregations.

13. The method of claim 12, wherein the weighted benefit-cost ratios are adjusted upon removal of an aggregation from the set of selected aggregations.

14. The method of claim 5, wherein maintaining the set of usage statistics comprises capturing a query at a predetermined interval.

15. The method of claim 14, wherein the predetermined interval is in the range from every issued query to every tenth issued query.

16. A computer-readable medium having computer-executable instructions for performing a method comprising:

maintaining a set of usage statistics on a plurality of queries;

determining a set of aggregations that can provide at least a part of an answer to the plurality of queries;

using the set of usage statistics to determine at least one aggregation from the set of aggregations to instantiate.

17. The computer-readable medium of claim 16, wherein maintaining a set of usage statistics comprises maintaining a frequency count of the number of times each query in the plurality of queries is issued.

18. The computer-readable medium of claim 16, wherein maintaining a set of usage statistics comprises maintaining a query execution time for each query in the plurality of queries.

19. The computer-readable medium of claim 16, wherein maintaining a set of usage statistics comprises maintaining a user identification for each query in the plurality of queries.

20. A computer-readable medium having computer executable instructions for performing a method for determining an aggregation to instantiate, the method comprising:

maintaining a set of usage statistics on a goal set comprising a plurality of queries;

maintaining a set of candidate aggregations selected according to an ability for the aggregation to answer at least one query in the goal set;

maintaining a set of selected aggregations that are currently instantiated;

for each candidate aggregation in the set of candidate aggregations performing the tasks:

determining a raw benefit-cost ratio for the candidate aggregation, said raw benefit-cost ratio comprising a performance improvement attributable to the aggregation, determining a weighted benefit-cost ratio by adjusting the raw benefit-cost ratio according to a usage statistic from the set of usage statistics, said usage statistic associated with a query from the plurality of queries that can be answered by the aggregation; and moving the aggregation from the set of candidate aggregations to the set of selected aggregations when the weighted benefit-cost ratio exceeds the weighted benefit-cost ratio of the aggregations in the set of candidate aggregations.

21. The computer-readable medium of claim 20, wherein the raw benefit-cost rating for an aggregation is determined as a function of at least one of a size of the aggregation and a size of another aggregation.

22. The computer-readable medium of claim 20, wherein maintaining a set of usage statistics comprises maintaining a frequency count of the number of times each query in the plurality of queries is issued.

23. The computer-readable medium of claim 20, wherein maintaining a set of usage statistics comprises maintaining a query execution time for each query in the plurality of queries.

24. The computer-readable medium of claim 20, wherein maintaining a set of usage statistics comprises maintaining a user identification for each query in the plurality of queries.

25. The computer-readable medium of claim 20, wherein the set of candidate aggregations is sorted in order of the weighted benefit-cost ratings associated with each aggregation in the set of candidate aggregations.

26. The computer-readable medium of claim 20, further comprising selecting the candidate aggregation having the highest weighted benefit/cost rating from the set of candidate aggregations and moving the candidate aggregation to the set of selected aggregations.

27. The computer-readable medium of claim 20, further comprising removing an previously selected aggregation from the set of selected aggregations to the set of candidate aggregations when an aggregation having a higher weighted benefit-cost ratio is moved from the set of candidate aggregations to the set of selected aggregations.

28. The computer-readable medium of claim 20, wherein the weighted benefit-cost ratios are adjusted upon removal of an aggregation from the set of selected aggregations.

29. The computer-readable medium of claim 20, wherein maintaining the set of usage statistics comprises capturing a query at a predetermined interval.

30. The computer-readable medium of claim 29, wherein the predetermined interval is in the range from every issued query to every tenth issued query.

31. A computerized system comprising:

a processor and a computer-readable medium;

an operating environment executing on the processor from the computer-readable medium;

an OLAP server executing under the control of the operating environment and operative to receive a plurality of queries and maintain a plurality of aggregations;

a query collection component of the OLAP server operative to maintain a set of usage statistics associated with the plurality of queries; and an optimizer component operative to analyze the usage statistics to determine a subset of the plurality of aggregations to instantiate in a data store.

32. The computerized system of claim 31, wherein the usage statistics include a frequency count comprising the number of times a query in the plurality of queries has been issued.

33. The computerized system of claim 31, wherein the usage statistics include a user identification of a user issuing a query of the plurality of queries.

34. The computerized system of claim 33, wherein the subset of the plurality of aggregations is selected according to the user identification.

35. The computerized system of claim 31, wherein the usage statistics include a query execution time for each query of the plurality of queries.

36. The computerized system of claim 35, wherein the subset of the plurality of aggregations is selected according to the query execution time.

37. The computerized system of claim 31, wherein the analyzer component is operative to determine a weighted benefit-cost ratio for each of the plurality of aggregations and determines the subset of the plurality of aggregations to instantiate according to the weighted benefit-cost ratio.

\* \* \* \* \*